United States Patent [19]

Bilsens et al.

[11] 3,973,211

[45] Aug. 3, 1976

[54] COMBINER-DEMODULATOR FOR PHASE SHIFT KEYED SUPPRESSED CARRIER SIGNALS RECEIVED OVER TWO TRANSMISSION PATHS

[75] Inventors: Gunars Bilsens; Raymond Oscar Figueroa, both of Scottsdale, Ariz.

[73] Assignee: Motorola, Inc., Chicago, Ill.

[22] Filed: June 23, 1975

[21] Appl. No.: 589,631

[52] U.S. Cl............................... 329/105; 325/329; 325/349; 325/367; 329/112; 329/117; 329/122; 329/167; 329/170
[51] Int. Cl.²........................................ H03D 3/00
[58] Field of Search ........... 329/103, 105, 112, 117, 329/122, 167, 168, 170; 325/45, 49, 329, 344, 349, 367

[56] References Cited
UNITED STATES PATENTS
3,906,380  9/1975  Querry et al....................... 329/122

*Primary Examiner*—Siegfried H. Grimm
*Attorney, Agent, or Firm*—Sang Ki Lee; Harry M. Weiss

[57] ABSTRACT

Two signals received by spaced antennas or equivalent diversity receiving systems and having identical data signals, phase modulated on frequency-identical suppressed carrier signals, are combined to produce a more nearly error-free data output. Each input signal, after heterodyning, is multiplied by a distinct feedback signal to produce a phase-coherent carrier and a recovered data signal. Each carrier is filtered by a narrow bandpass filter and connected to a separate adder. The two multiplier outputs are also added together, then filtered in a low pass filter to provide a combined recovered data signal. This combined data signal is added separately to each coherent-phase carrier to provide the two distinct feedback signals for the input multipliers. When each carrier is phase modulated in quadrature with the same two data signals, the signals are phase shifted, after heterodyning, to separate the quadrature components. Each pair of in-phase components is demodulated as if it were detached from the other with the exception that the two multiplier outputs resulting from each carrier also are added and connected through a common bandpass filter before being added individually to the outputs of the corresponding low pass filters to produce the four feedback signals.

2 Claims, 4 Drawing Figures

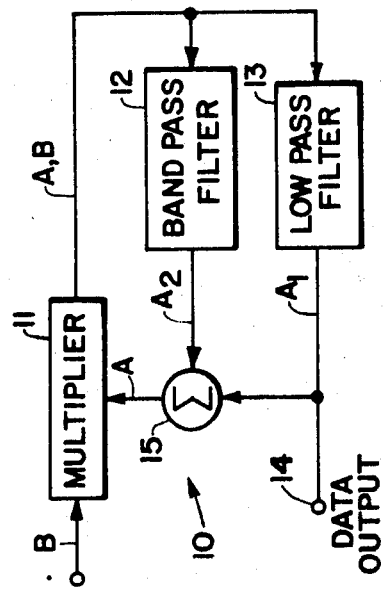
FIG. 2
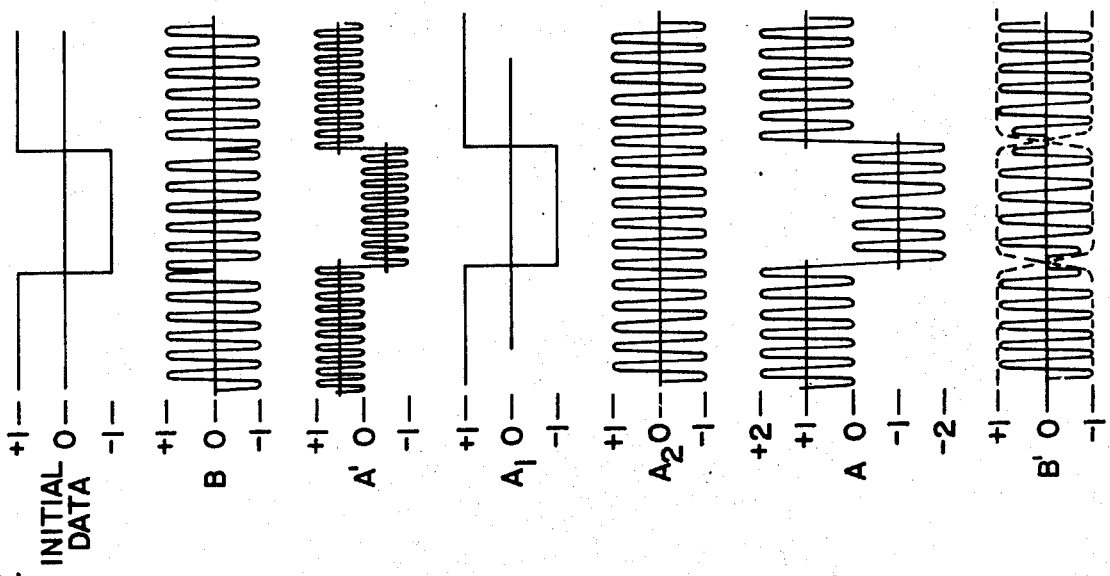
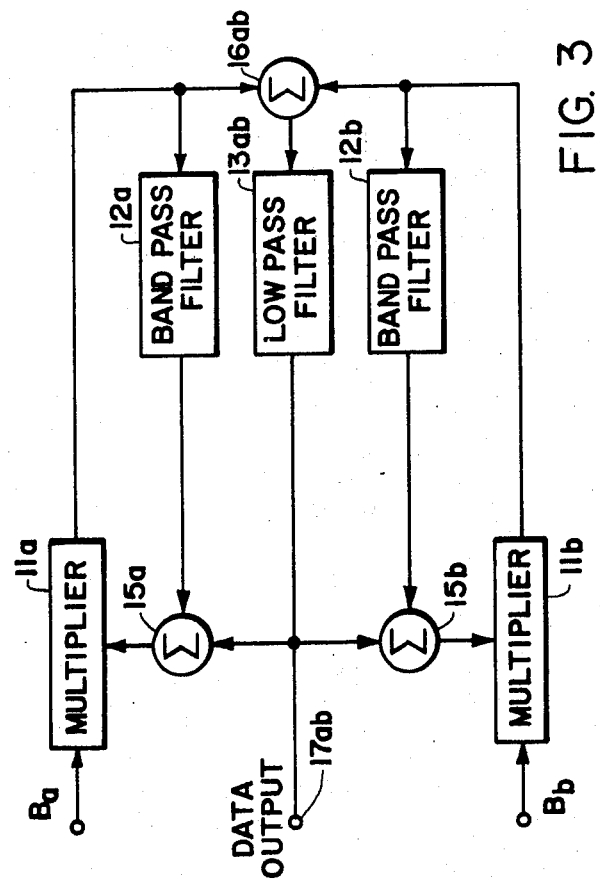
FIG. 1
FIG. 3

3,973,211

COMBINER-DEMODULATOR FOR PHASE SHIFT KEYED SUPPRESSED CARRIER SIGNALS RECEIVED OVER TWO TRANSMISSION PATHS

BACKGROUND OF THE INVENTION

This invention relates to the transmission and reception of digital data and more specifically to optimal decoding of digital data from phase-modulated carriers.

Digital data signals, i.e., signals consisting of "marks" and "spaces" or "ones" and "zeros" are widely used today for the efficient transmission of coded data, up to and including space transmission. Since each change of phase of the modulated carrier represents one bit, much effort has been extended to improve the accuracy of the decoded data. Probably foremost among the problems involved are noise and fading. Among methods of overcoming these problems are frequency diversity (more than one carrier frequency bearing the same data) and space diversity a single carrier frequency with multiple receiving antennas, typically spaced ten wavelengths or more apart). Many systems take advantage of the fact that the strongest signal is normally the best; some use means such as square law detection which allows the strongest signal to supply a disproportionately large part of the output signal. One disadvantage of most of the prior art is the need for frequency division. Since the carrier frequency, which was not transmitted, is required to be present for recovery of the data, the original carrier frequency must somehow be restored. Since a double carrier frequency is a resultant of most demodulation methods, the carrier frequency is normally recovered by means of a divider circuit.

SUMMARY OF THE INVENTION

It is the object of this invention to provide, with a reduced number of components, improved reception of transmitted data. This is done, according to the invention, by the use of at least two diversity receiving systems such as spaced antennas plus an improved demodulation system. Each incoming signal is connected to a separate multiplier wherein it is multiplied by a feedback signal to produce a phase coherent carrier signal and a recovered data signal. This system is more fully described in co-pending application Ser. No. 589,273 filed on June 23, 1975.

Each phase coherent carrier signal is separated by a bandpass filter and connected to an adder. The output of the two multipliers are also added, then connected through a lowpass filter to produce a combined recovered data signal which is fed to each of the aforementioned adders and also provides a data output signal. The combined recovered data signal is used as a common reference for both multipliers, each restored carrier is locked in phase (or in anti-phase) with the instantaneous phase of the respective received signal. However, since the phase of the data signal can be reversed, an ambiguity exists which can be solved by using differentially encoded data signals. This method of coding, which is well known in the art, uses a change of phase to indicate a "mark" or a "one", and a lack of change of phase to indicate a "space" or "zero."

When each of the two or more separately received, suppressed carrier signals is modulated with two data signals in a quadrature relationship, the above system is used with the following exceptions. After heterodyning, each received carrier is phase shifted to produce two signals in quadrature. Each pair of matching quadrature data signals then is demodulated as above but the outputs of each pair of complementary multipliers are added and connected through a common bandpass filter from which each combined carrier is connected to the two adders associated with that carrier wherein it is combined with the two recovered data signals to produce the feedback signals for the multipliers.

BRIEF DESCRIPTION OF THE DRAWING

FIG. 1 is a block diagram of the basic demodulator circuit.

FIG. 2 is a chart of the waveforms of the circuit of FIG. 1.

FIG. 3 is a block diagram of a signal combiner/phase demodulator according to the invention.

DESCRIPTION OF THE PREFERRED EMBODIMENT

Figure 4:
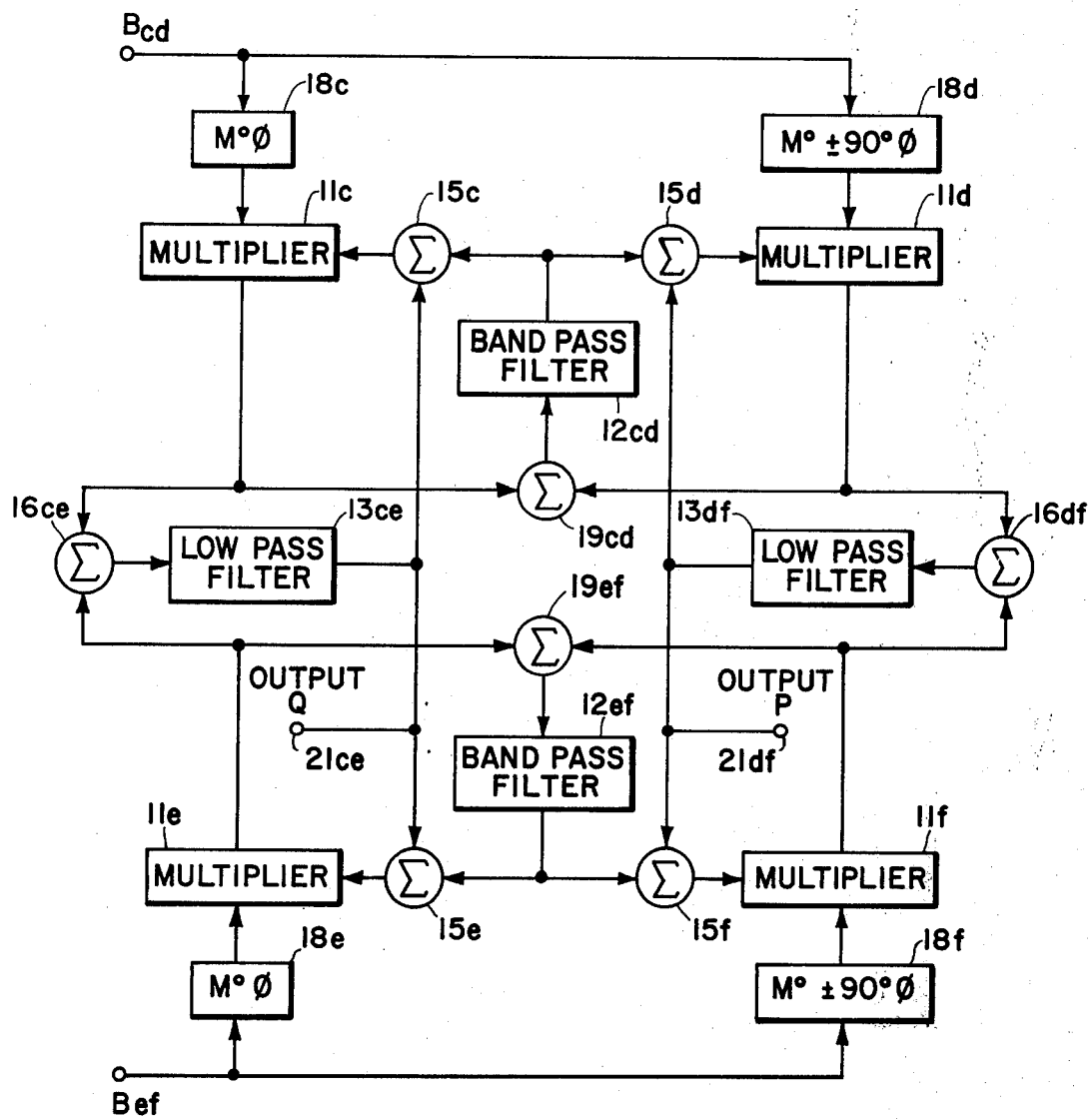
FIG. 4 is a block diagram of the combiner of FIG. 3 as used for quadrature-modulated carriers.

FIG. 1 shows the basic circuit 10 upon which the combiner is based, and will be best understood in relation to FIG. 2 which shows the pertinent waveforms. Initial data in digital form is transmitted by PSK (phase shift keying). A convenient way of transmitting these signals is through the use of suppressed carrier transmission where the transmitted and received signal is of the form B. In the preferred embodiment, initial data is differentially encoded to remove phase ambiguity. Also, in the preferred embodiment the input signals are heterodyned before demodulation, but this is not required within the spirit and scope of the invention. With heterodyning, the demodulator input signal would still be of the form of B, i.e., a carrier aperiodically shifted 180° in phase in accordance with the data to be transmitted. The signal B is connected to one input of a multiplier 11 wherein it is multiplied by a feedback signal A which will be described later. The output of the multiplier 11 is connected to both a bandpass filter 12 and a low pass filter 13. The multiplier output contains the received data signal, the received (or heterodyned) carrier and a component having double carrier frequency. The output of the bandpass filter is the coherent phase carrier frequency $A_2$. The output of the low pass filter is the recovered data signal $A_1$. The double frequency term is no longer present. The signal $A_1$ is also available at the data output terminal 14. Signals $A_1$, $A_2$ are added in adder 15 to form signal A which is the feedback signal provided to the second input terminal of the multiplier 11.

Waveform B of FIG. 2 is a somewhat idealized representation of the received signal, waveform B' being closer to the actual case due to bandwidth limitation in the transmission system. This limiting, however, does not cause a problem since the characteristics of the carrier loop (containing multiplier 11, filter 12 and adder 15) are such as to provide signal $A_2$ at a constant amplitude.

To establish a mathematical basis for the operation of the circuit described above, a reference voltage A is assumed to exist at the second input of the multiplier. This voltage must contain the proper elements for self-regeneration, that is, the data and a reference carrier without phase modulation must be included.

Assume a general formula in which $$A = P + K \cos \theta t$$

where $k$ is an arbitrary amplitude value for the carrier content fed back to the multiplier.

$E_{in}$ = input signal = $Pn \cos \theta t$
$P$ = data signal = $\pm 1$
$\theta$ = angular velocity of carrier = $2\pi f_c$
$\mu_1$ = gain of low pass (data) filter
$\mu_2$ = gain of carrier frequency bandpass filter
$\mu_3$ = gain of multiplier in terms of voltage out for voltage applied to control electrodes.
$E_{out}$ = output of multiplier = $\mu_3 E_{in} A$
  = $\mu_3 (nP \cos \theta t)(P + k \cos \theta t)$
  = $\mu_3 n \cos t\,\theta t + \mu_3 n Pk/2 + \mu_3 n Pk (\cos 2\theta t)/2$
$E_{bp}$ = bandpass filter output = $\mu_3 \mu_2 n \cos \theta t$
$E_{lp}$ = low filter output = $\mu_1 \mu_3 Pk/2$ Note that the double frequency term is no longer present. Now since $A = E_{bp} + E_{lp}$ $$P = k \cos \theta t = \mu_1 \mu_3 n Pk/2 + \mu_2 \mu_3 n \cos \theta t$$

In order for the loop to maintain stability, meaning that the signals neither grow nor decay in amplitude, the coefficient of both sides of the above equation must be equal.

$$\mu_1 \mu_3 nk/2 = 1$$

and $$\mu_2 \mu_3 n/k = 1$$

For stable operation, two conditions must be met. One, the threshold signal level must be $$n = k/\mu_2 \mu_3$$

and, secondly, the ratio between bandpass and low pass gains must be $$\mu_2/\mu_1 = k^2/2$$

where $k$ determines the ratio of amplitudes of the carrier and the data content of the signal $E_r$, the signal applied is reference to the multiplier.

In FIG. 3 is shown a block diagram of the signal combiner/phase demodulator according to the invention. Here the same data has been received by diversity reception, such as spaced antennas, whereby such effects as fading, noise, etc., are not identical in the received signals. One input signal $B_a$ is connected to one input terminal of a multiplier 11a. The output of the multiplier is fed to a bandpass filter 12a and an adder 16ab. The output of the filter 12a, which is the phase coherent carrier, is connected to an input of an adder 15a. A second signal $B_b$ is connected to the input of a multiplier 11b, and the output of the multiplier is connected to a bandpass filter 12b and the adder 16ab. The output of the bandpass filter 12b is connected to an input of an adder 15b. The adder 16ab adds the output of the two multipliers 11a, 11b, and the output of the adder is connected to a low pass filter 13ab. The output of the low pass filter is the sum of the two received data signals, termed the recovered data signal, and is connected to a data output terminal 17ab. The output of the low pass filter 13ab is also connected to the two adders 15a and 15b. Adder 15a combines the output of the low pass filter and the output of the bandpass filter 12a to form the feedback signal for the second input of the multiplier 11a. The adder 15b adds the output of the low pass filter 13ab and the output of the bandpass filter 12b to form the feedback signal which is connected to the second input terminal of the multiplier 11b. It should be noted here that since the carrier of signal $B_b$ does not pass through the multiplier 11a and vice versa, any phase differences between the two incoming signals are not a problem. However, the recovered data signal is a combination of both received signals, and is therefore improved in accuracy over either of them.

FIG. 4 shows the use of the signal combiner/phase demodulator of FIG. 3 in the case wherein each of the diversity received signals contains two data signals phase modulated in quadrature. One signal $B_{cd}$ is received and connected to phase shifters 18c, 18d to produce two quadrature components which are connected to multipliers 11c and 11d. The second received signal $B_{ef}$ is likewise phase shifted by means of 18e, 18f to produce the two quadrature components, which are connected to inputs of multipliers 11e and 11f respectively. The pairs of components which are in phase ($B_c$, $B_e$) ($B_d$, $B_f$) are then processed as in FIG. 3. The output of the multiplier 11c goes to an adder 16ce and an adder 19cd. The output of the multiplier 11e goes to the adder 16ce and an adder 19ef. The output of the multiplier 11d is connected to the adder 19cd and an adder 16df. The output of the multiplier 11f is connected to the adder 19ef and the adder 16df. The output of the adder 16ce is connected to a low pass filter 13ce, wherein the two in-phase components are added for error reduction, and the output connected to adders 15c and 15e and also to an output terminal 21ce. The output of the adder 16df is connected to a low pass filter 13df wherein the other pair of in-phase components are combined for error reduction of the second quadrature data signal. The output of the filter 13df goes to an adder 15d and an adder 15f and to an output terminal 21df. The output of the adder 19cd is connected to a bandpass filter 12cd. The output of the bandpass filter 12cd is connected to the adders 15c and 15d and is the phase coherent carrier derived from input signal $B_{cd}$. In the adder 15c the output of the filter 12cd is added to the output of the low pass filter 13ce to produce the feedback signal for the multiplier 11c. In the adder 15d the output of the bandpass filter 12cd is added to the output of the low pass filter 13df to produce the feedback signal at the second input of the multiplier 11d. The output of the adder 19ef is connected to a bandpass filter 12ef to produce a second phase coherent carrier for use in the circuit of the second received signal $B_{ef}$. The output of the filter 12ef is connected to the adders 15e, 15f. The adder 15e combines the output of the bandpass filter 12ef and the low pass filter 13ce to form the feedback signal for the second input of the multiplier 11e. The adder 15f combines the output of the bandpass filter 12ef and the low pass filter 13df to provide the feedback signal for the second input of the multiplier 11f. Each quadrature component, then, of each of the received signals, is multiplied by a feedback signal consisting of its own phase coherent carrier and its recovered data signal. Each pair of quadrature components on one received signal uses only one bandpass filter and each pair of in phase components uses a single low pass filter wherein the recovered data is combined for greater accuracy.

What is claimed is:

1. In a diversity receiver for receiving a plurality of suppressed carrier signals, phase modulated with a data signal, including a system for combining and demodulating said suppressed carrier signals, said system comprising:
  first means for multiplying a first one of the suppressed carrier signals by a first regenerative feedback signal;
  first filter means for recovering a first phase-coherent carrier from the output of the first multiplier means;
  second means for multiplying a second one of the suppressed carrier signals by a second regenerative feedback signal;
  second filter means for recovering a second phase-coherent carrier from the output of the second multiplier means;
  first adder means for combining the outputs of the first and second multipliers;
  third filter means for recovering the data signal from the output of the first adder means;
  second adder means for combining said first phase-coherent carrier and said data signal to produce the first regenerative feedback signal;
  third adder means for combining said second phase-coherent carrier and said data signal to produce the second regenerative feedback signal; and
  an output terminal for the data signal connected to the output of the third filter means.

2. In a diversity receiver for receiving a plurality of suppressed carrier signals, phase modulated with two data signals in quadrature, including a system for combining and demodulating said suppressed carrier signals, said system comprising:
  first phase shifter means for producing two signals in quadrature from a first one of said suppressed carrier signals;
  first means for multiplying one of the quadrature components of the first one of said suppressed carrier signals by a first regenerative feedback signal;
  second means for multiplying the second quadrature component of the first one of said suppressed carrier signals by a second regenerative feedback signal;
  second phase shifter means for producing two signals in quadrature from a second one of said suppressed carrier signals;
  third means for multiplying the first quadrature component of the second one of said suppressed carrier signals by a third regenerative feedback signal;
  fourth means for multiplying the second quadrature component of the second one of said suppressed carrier signals by a fourth regenerative feedback signal;
  first adder means for combining the output of the first multiplier means and the third multiplier means;
  first filter means for recovering a first data signal from the output of the first adder means;
  second adder means for combining the output of the second multiplier means with the output of the fourth multiplier means;
  second filter means for recovering a second data signal from the output of the second adder means;
  third adder means for combining the outputs of the first multiplier means and the second multiplier means;
  third filter means for producing from the output of the third adder means a phase coherent carrier;
  fourth adder means for combining the outputs of the third filter means and the first filter means to produce the first regenerative feedback signal;
  fifth adder means for combining the outputs of the second filter means and the third filter means to produce the second regenerative feedback signal;
  sixth adder means for combining the outputs of the third multiplier means and the fourth multiplier means;
  fourth filter means for producing from the output of the sixth adder means a second phase coherent carrier;
  seventh adder means for combining the outputs of the fourth filter means and the first filter means to produce the third regenerative feedback signal; and
  eighth adder means for combining the outputs of the fourth filter means and the second filter means to produce the fourth regenerative feedback signal.

* * * * *